Figure 1:
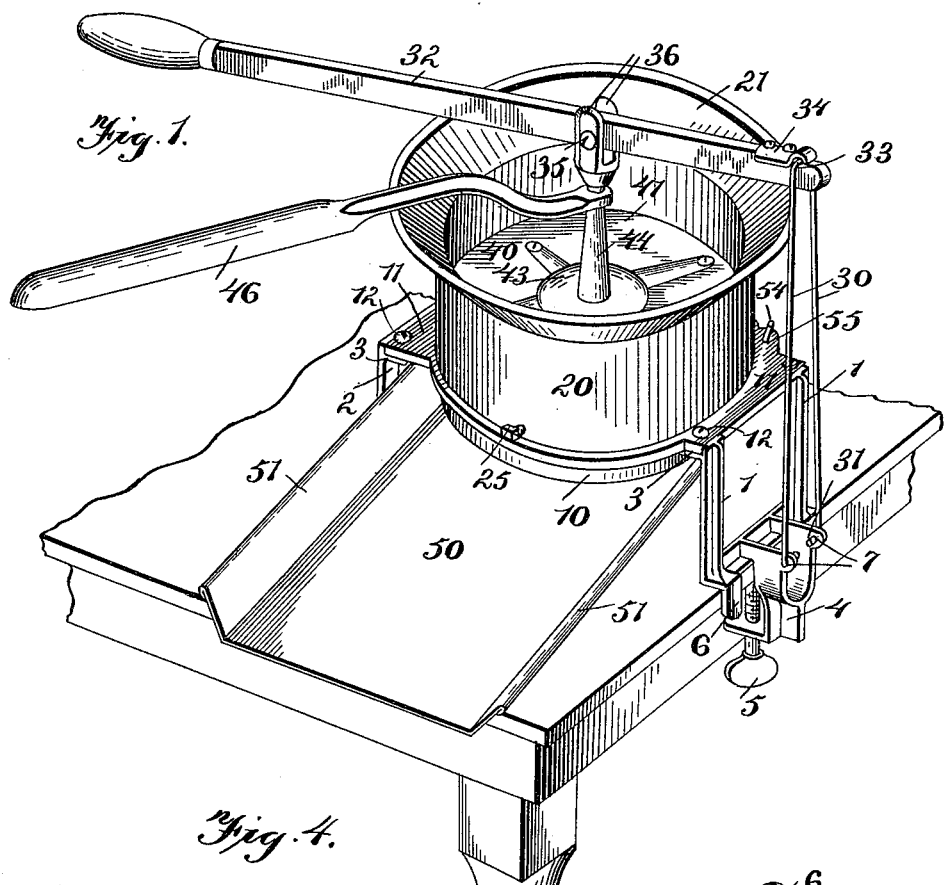

No. 636,708. Patented Nov. 7, 1899.
A. H. BALES.
FRUIT PRESS.
(Application filed Mar. 7, 1899.)
(No Model.)
2 Sheets—Sheet 1.

Witnesses
Geo. E. Frech.
J. H. Jochum Jr.

Inventor
Hanson H. Bales
by Collamer & Co.
Attorneys

THE NORRIS PETERS CO., PHOTO-LITHO., WASHINGTON, D. C.

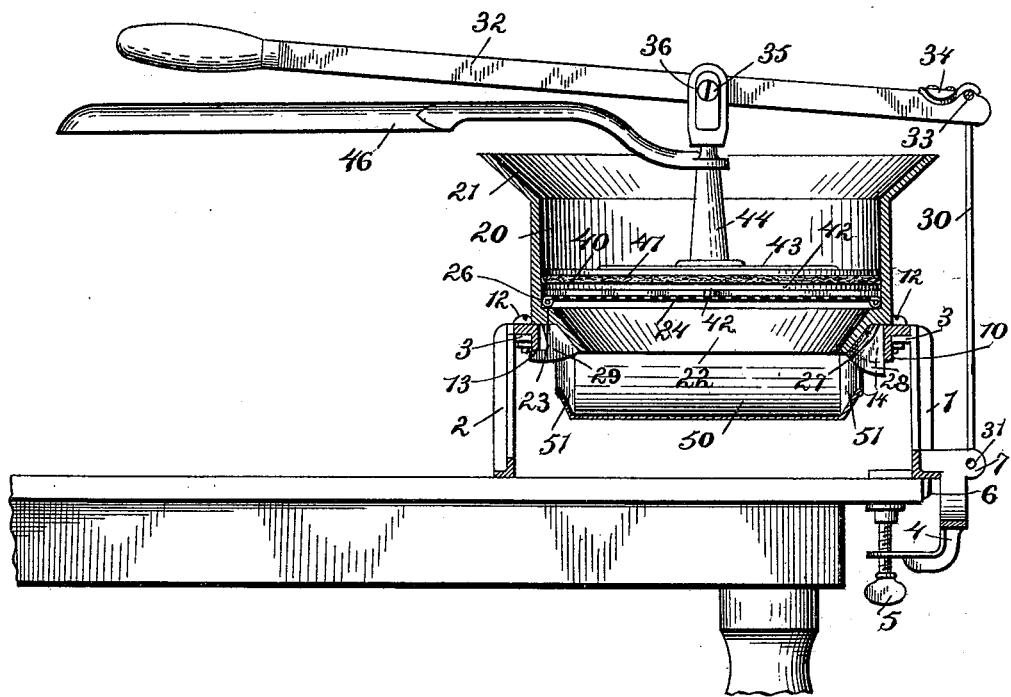

UNITED STATES PATENT OFFICE.

ALANSON H. BALES, OF WASHINGTON, KANSAS.

FRUIT-PRESS.

SPECIFICATION forming part of Letters Patent No. 636,708, dated November 7, 1899.

Application filed March 7, 1899. Serial No. 708,113. (No model.)

*To all whom it may concern:*

Be it known that I, ALANSON H. BALES, a citizen of the United States, and a resident of Washington, Washington county, State of Kansas, have invented certain new and useful Improvements in Fruit-Presses; and my preferred manner of carrying out the invention is set forth in the following full, clear, and exact description, terminating with claims particularly specifying the novelty.

This invention relates to presses, and more especially to that class thereof which are used for expressing juice or the like from fruit or berries by means of a plunger and lever; and the object of the same is to produce a device possessing certain improvements over that shown in my former United States patent, No. 605,267, issued June 7, 1898.

To this end the invention consists in the details hereinafter more fully described, which are subject of claims attached.

The entire machine is shown in the drawings accompanying this specification, and in which—

Figure 4:
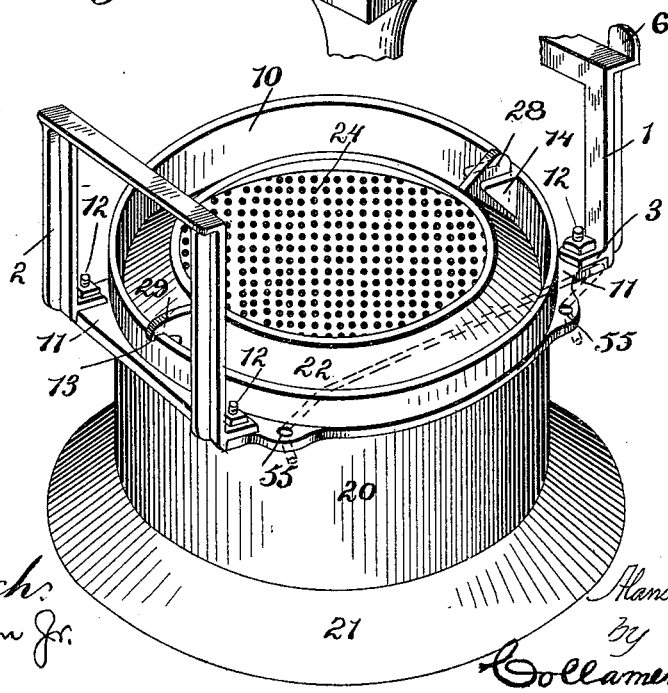

Figure 1 is a perspective view of this machine complete. Fig. 2 is a central vertical section on a line across the pan and parallel with the bail and lever. Fig. 3 is a side elevation taken from a point quartering to the point of view in Fig. 2 and showing the table-clamp in elevation. Fig. 4 is a perspective detail of the bowl inverted and a part of the rim with its notch and lugs, showing also the fastening of the legs and the pan-hooks to said rim.

Referring to the accompanying drawings, the numerals 1 and 2 designate the two parts of the supporting-base. The part 2 comprises a substantially U-shaped metallic piece, whose flat bottom rests on an ordinary table, whose uprights constitute two legs, and whose upper ends 3 are inturned, for a purpose to appear below. The part 1 is of substantially the same construction, with the same inturned upper ends 3; but in addition its flat bottom carries at the center of its length an ordinary table-clamp 4, with hand-screw 5 for engaging upward beneath the edge of the table. The lower ends of its upright legs may be provided with lips 6 for engaging against the edge of the table-top, and said table-clamp is provided on its outer face with two eyes 7, for a purpose to appear hereinafter. Mounted on this base is a metallic rim 10, whose flat upper face is extended at four points to form corners 11, resting on the upper ends 3 of the legs of the base, and secured to them by screws or bolts 12. In the vertical portion of this rim, (whose body is of approximately L shape in section,) at the lower edge at one side, is a notch 13, and projecting inward from its diametrically opposite side are two spaced lugs 14.

20 is the bowl, preferably, also, of metal, but porcelain-lined, and made with flaring top 21 and contracted bottom 22, forming an interior shoulder 23, upon which rests the strainer 24, which may be held in place by a thumb or set screw 25 passing through the wall of the bowl against one edge of the strainer. The latter is preferably a perforated metal sheet turned over a wire at its surrounding edge, as shown at 26, although the construction is not important. The contraction of the bottom of the bowl also produces a flat exterior shoulder 27, which rests squarely on the rim when the bowl is in place, and projecting from this contracted portion at one side is a lug 28 and at the other side an outwardly-opening hook 29. When the bowl is inserted within the rim, said hook is first passed down through the rim and engaged with the notch 13 thereof, and then the lug 28 is dropped into position between the two spaced lugs 14 in the rim. Thus the hook prevents the vertical and the engaging lugs the axial displacement of parts. The strainer is then inserted in the bowl and fastened in position, and it is obvious a coarser or finer strainer could be substituted at will without removing the bowl from the rim or the latter from its supporting-base.

30 is a bail consisting of a piece of stout wire of inverted-V shape, with inturned ends 31 sprung into the eyes 7 in the base, and 32 is the main operating-lever, having in its upper side, at one end, a notch 33 for receiving the center of the bail and a button or clamp 34, secured thereto adjacent the notch, whereby the center of the bail may be pivotally connected with one end of the lever, while the body of the latter extends across and some distance above the bowl. 35 is a bolt passing transversely through the lever at a point about above the axial center of the bowl, and this bolt supports the upper ends of two parts forming the socket member of a ball-and-socket joint, as described below. Each part 36 stands flat against the side of the lever, with an inturned lower end 37 containing half of said socket, and when the two parts are in place the socket is complete, as will be clear.

The follower consists of a circular or disk shaped bottom 40, preferably having packing 41 around its periphery, whereby it is caused to fit closely within the cylindrical part of the bowl, and preferably, also, having ribs on its lower face, as shown at 42. Secured by bolts or screws to the upper face of this bottom piece is a spider 43, having an integral metal standard 44 rising from its center and carrying a ball 45 at its upper end, this ball being of a size to fit the socket just above described. 46 is a handle either secured to or integral with said standard and projecting radially therefrom beneath the ball, its body being preferably turned upward, so that it will clear the upper edge of the bowl when in use.

50 is a pan of about the shape shown, with raised sides 51 and raised upper or rear end 52, preferably turned over a wire 53 in hinge form, the ends of this wire projecting upward and being hooked, as at 54, while 55 are holes in the horizontal portion of the base at proper points to receive these hooks.

All parts are of proper size, shape, proportion, and materials, being preferably entirely of metal, save possibly the lever and handle and the lining of the bowl. The follower-bottom might also be of wood, if desired, and its edge packing of tow or coarse rope.

In use the rim is bolted to the base, the latter set upon and fastened to a table or other suitable support, the bowl inserted within the rim and the strainer within the bowl, and the feet of the bail sprung into the eyes of the base. The fruit to be treated is then placed within the bowl and the pan hooked into place beneath it. The operator then grasps the outer end of the lever and so manipulates it as to bring the follower over and pass it down into the bowl onto the fruit. Thereafter the outer or handle end of the lever is raised and lowered to give the proper pounding or squeezing effect to the fruit, while the handle 46 is meanwhile turned slowly and from time to time to give the follower-bottom the proper axial motion within the bowl, so as to cause the fruit at all points to be pressed and the ribs on the follower to properly do their work. Obviously the hook on the bowl will prevent its rise out of place, and the engaging lugs will also prevent its rotation within the rim as the follower is turned. The juices extracted from the fruit pass through the strainer, fall into the pan, and are conducted away to a suitable receptacle. (Not shown herein.)

All parts of this device can be readily taken apart, as for cleansing or repair, and the whole (especially when so taken apart) occupies small space for convenience in storage or transportation.

What is claimed as new is—

1. In a fruit-press, the combination with a support in two substantially U-shaped parts, the base of each resting on a table or the like, the uprights constituting legs, and their upper ends being inturned, a table-clamp cast upon the base of one part and having two lips engaging the edge of the table-top and two eyes, and a rim having corners attached to said inturned ends; of a bowl supported within the rim and having an interior strainer, a bail pivoted in said eyes, a lever carried by the bail, and a follower supported by the lever, all as and for the purpose set forth.

2. In a fruit-press, the combination with a support in two parts one of which is clamped to a table-top or the like, and a rim carried by said support, the rim having a notch in its lower edge at one side and two inwardly-projecting spaced lugs at its other side; of a bowl having a contracted bottom with an exterior shoulder adapted to rest on said rim, a hook at one side and a lug at the other side of said contracted bottom for respective engagement with the notch and lugs of the rim, a follower, and means for reciprocating it within the bowl, as and for the purpose set forth.

3. In a fruit-press, the combination with a support, a rim supported thereby and having holes therein at its rear, a bowl carried by the rim, and a vertically-reciprocating follower within the bowl; of a pan with raised sides and rear end and a wire within, the latter having upturned and hooked ends adapted to engage said holes in the rim, as and for the purpose set forth.

In testimony whereof I have hereunto subscribed my signature this 4th day of March, A. D. 1899.

ALANSON H. BALES.

Witnesses:
GEO. NEWCOMB,
J. H. JAMARY.